US008434387B2

(12) United States Patent
Nakagiri et al.

(10) Patent No.: US 8,434,387 B2
(45) Date of Patent: May 7, 2013

(54) INDUSTRIAL ROBOT

(75) Inventors: Hiroshi Nakagiri, Osaka (JP); Sungjae Yoon, Osaka (JP); Makoto Kondo, Fujisawa (JP); Tatsuji Minato, Fujisawa (JP)

(73) Assignees: Daihen Corporation, Osaka-shi (JP); Kabushiki Kaisha Kobe Seiko Sho, Kobe-shi (JP)

( * ) Notice: Subject to any disclaimer, the term of this patent is extended or adjusted under 35 U.S.C. 154(b) by 246 days.

(21) Appl. No.: 13/085,890

(22) Filed: Apr. 13, 2011

(65) Prior Publication Data
US 2011/0252921 A1 Oct. 20, 2011

(30) Foreign Application Priority Data
Apr. 14, 2010 (JP) .................................. 2010-093153

(51) Int. Cl.
*B25J 18/00* (2006.01)
(52) U.S. Cl.
USPC .................... 74/665 R; 74/490.01; 74/490.03; 74/665 A
(58) Field of Classification Search ................ 74/665 A, 74/665 R, 490.01, 490.03
See application file for complete search history.

(56) References Cited

U.S. PATENT DOCUMENTS

| | | | | |
|---|---|---|---|---|
| 4,697,978 A | * | 10/1987 | Tada et al. ..................... | 414/729 |
| 4,802,815 A | * | 2/1989 | Funabashi et al. ............. | 414/680 |
| 4,972,731 A | * | 11/1990 | Akutagawa et al. ........ | 74/490.03 |
| 6,267,022 B1 | * | 7/2001 | Suzuki ...................... | 74/490.01 |
| D636,004 S | | 4/2011 | Nakagiri et al. | |
| D636,419 S | | 4/2011 | Nakagiri et al. | |
| D636,803 S | | 4/2011 | Nakagiri et al. | |
| 2005/0204850 A1 | * | 9/2005 | Nihei et al. ................ | 74/490.01 |
| 2008/0034920 A1 | | 2/2008 | Inoue et al. | |
| 2009/0178506 A1 | * | 7/2009 | Yamamoto et al. ........ | 74/490.03 |

FOREIGN PATENT DOCUMENTS

| | | |
|---|---|---|
| JP | 5-131388 | 5/1993 |
| JP | 2006-26748 | 2/2006 |
| JP | 4233578 | 12/2008 |

OTHER PUBLICATIONS

U.S. Appl. No. 13/074,527, filed Mar. 29, 2011, Nakagiri, et al.

* cited by examiner

*Primary Examiner* — Ha D Ho
(74) *Attorney, Agent, or Firm* — Oblon, Spivak, McClelland, Maier & Neustadt, L.L.P.

(57) ABSTRACT

The present invention relates to an industrial robot and aims to provide an industrial robot capable of ensuring a long distance from a rotation axis of an arm to a tool mounting portion and accurately positioning the tool mounting portion by a compact structure. In a swing arm 150, the rotation of a tool mounting rotation arm driving motor 311 is transmitted to a pivot shaft 313 via a tool mounting rotation arm driving transmission mechanism 300, the rotation of a tool mounting portion driving motor 411 is transmitted to an intermediate power transmission shaft 422 via a tool mounting portion driving first transmission mechanism 412a, and the rotation of the intermediate power transmission shaft 422 is transmitted to an output power transmission shaft 426 via a tool mounting portion driving second transmission mechanism 412b, thereby rotating a tool mounting portion 170 while being decelerated by a tool mounting portion driving reduction unit 413.

10 Claims, 10 Drawing Sheets

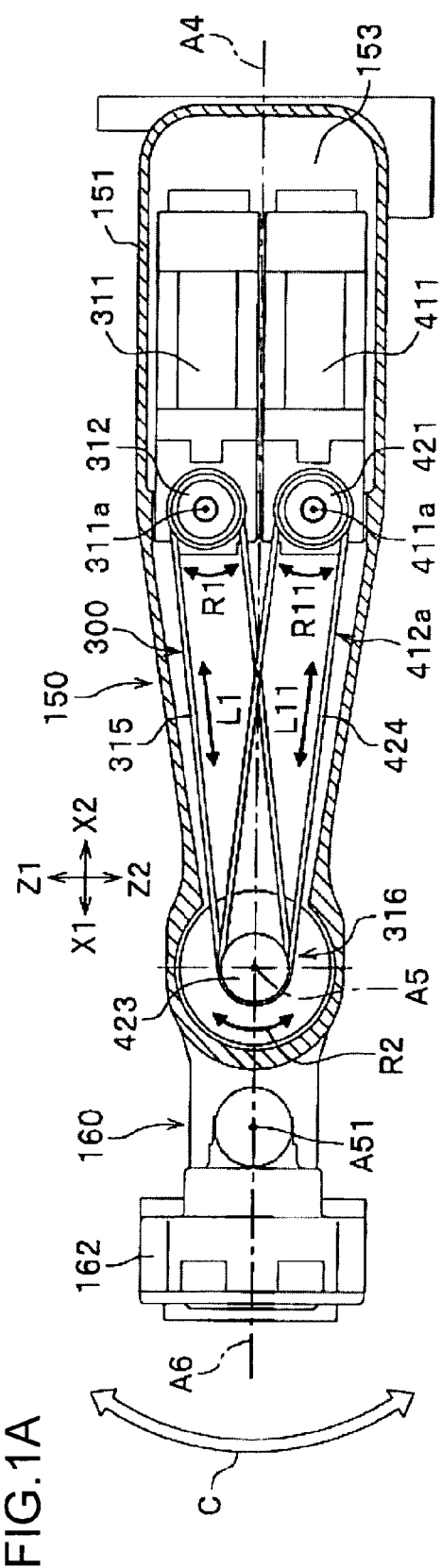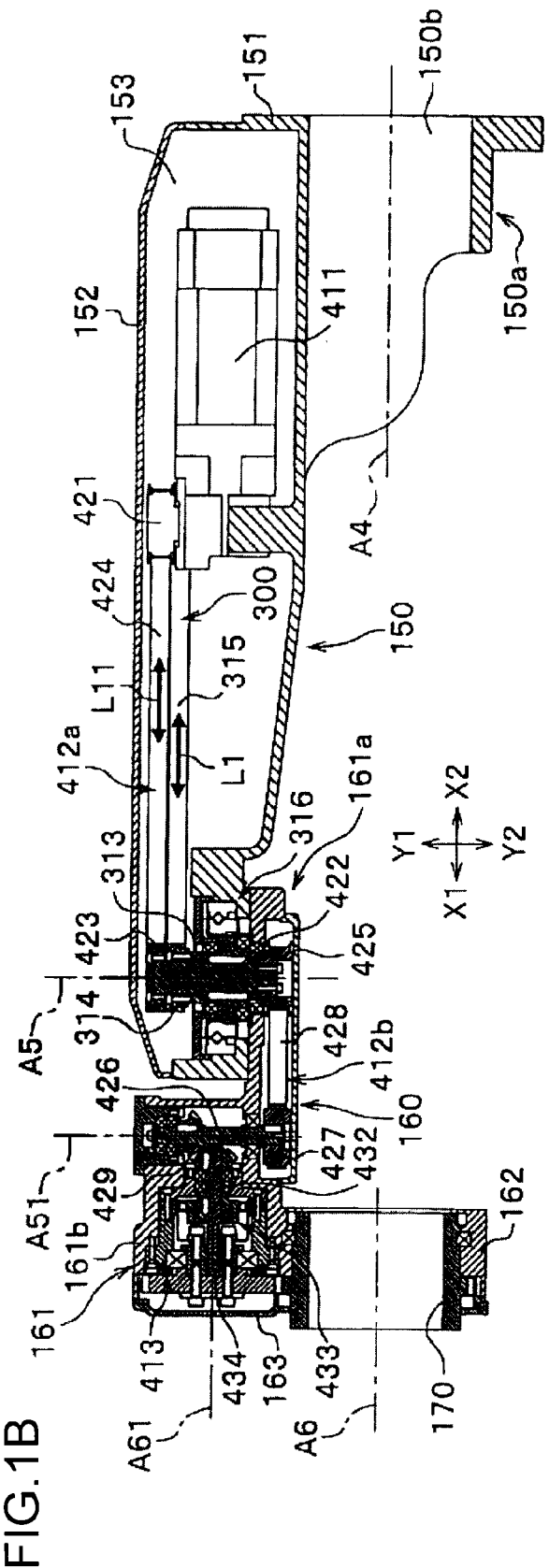

INTERFERENCE

INDUSTRIAL ROBOT

BACKGROUND OF THE INVENTION

1. Field of the Invention

The present invention relates to an industrial robot including a rotary arm for welding or the like.

2. Description of the Related Art

So-called articulated robots and other robots are, for example, used as industrial robots such as welding robots. Industrial robots such as welding robots are faced with a growing demand to perform welding in narrow places. Accordingly, downsizing of a tool mounting portion, to which a tool is to be mounted, and its vicinity is hoped to avoid interference with surrounding objects such as a work. Thus, it is necessary to optimize a driving mechanism of a tool mounting portion and a driving mechanism of an arm to which the tool mounting portion is to be mounted.

As a technology on a structure of a tool mounting portion of an articulated robot, to which a tool is to be mounted, there has been proposed a structure for avoiding interference with surrounding objects such as a work by changing a mounted position of a motor for driving and rotating an end effector relative to an end effector mounting portion (see, for example, Japanese Unexamined Patent Publication No. 2006-26748, hereinafter referred to as patent literature 1).

For an industrial robot, there has been also proposed a structure for avoiding interference with surrounding objects such as a work by vertically symmetrically arranging two sets of gear sets, which have symmetric twist directions commonly using two axis lines supported only on one end to downsize a wrist structure (see, for example, Japanese Patent Publication No. 4233578, hereinafter referred to as patent literature 2).

Further, for an industrial robot, there has been proposed a structure for avoiding interference with surrounding objects such as a work by arranging a reduction mechanism for pivoting motions on a pivot shaft in a robot including an obstruction-free and continuous passage for allowing passage of a power line, pipe arrangement and signal line for an end effector in an arm to downsize a wrist structure (see, for example, Japanese Unexamined Patent Publication No. H05-131388, hereinafter referred to as patent literature 3).

However, in the industrial robot disclosed in patent literature 1, a motor 603 for driving and rotating a tool 601 is mounted and arranged in a tool mounting portion 602 to which the tool 601 is mounted as shown in FIG. 7. Thus, if the arm 604 having the tool mounting portion 602 mounted thereto is pivoted relative to an arm 605 in directions of arrows X as shown in FIGS. 7A and 7B, a cable 606 connected to the tool 601 mounted to the tool mounting portion 602 interferes with the motor 603.

Further, as shown in FIG. 7C, the motor 603 interferes with a work object 607 when the tool 601 is inserted into a narrow place of the work object 607. At this time, since the mounted position of the motor 603 is changed according to an operation in the robot disclosed in patent literature 1, operation efficiency decreases.

In an industrial robot, if a distance between a tool mounting portion 612 having a tool 611 mounted thereto and a rotation axis A11 of an arm 613 having the tool mounting portion 612 mounted thereto relative to an arm 614 is shortened as shown in FIG. 8A, a bend radius of a cable 615 connected to the tool 611 decreases and a load acts on the cable 615. Thus, failures occur in the feed of a welding wire and supply of welding gas, for example, in a welding robot or the like, wherefore a welding failure occurs.

Thus, in the industrial robot, it is desired to extend the distance between the tool mounting portion 612 having the tool 611 mounted thereto and the rotation axis A11 of the arm 613 having the tool mounting portion 612 mounted thereto relative to the arm 614 as shown in FIG. 8B.

However, the industrial robot disclosed in patent literature 2 is structured to drive and rotate a tool mounting portion 612 mounted to an arm 613 via a bevel gear 621 as shown in FIGS. 9A and 9B. Thus, if a distance from the tool mounting portion 612 to a rotation axis A21 is long, a diameter of the bevel gear needs to be increased to engage the bevel gear 621 with the tool mounting portion 612. If the diameter of the bevel gear 621 increases, the vicinity of the arm 613 becomes larger. This deteriorates application efficiency to a work and increases a gear ratio, wherefore positioning accuracy of a tool 611 is deteriorated.

Further, if the diameter of the bevel gear 621 is reduced as shown in FIGS. 10A and 10B in the industrial robot disclosed in patent literature 2, a bend radius of a cable 615 decreases and a load acts on the cable 615 when the arm 613 is rotated.

Further, in the industrial robot disclosed in patent literature 3, two reduction mechanisms, i.e. one for pivoting the arm and the other for rotating the tool mounting portion need to be arranged on the pivot shaft of the arm. Thus, the thickness of the arm increases to enlarge the arm. Further, since the reduction mechanism is directly mounted on the arm in the structure disclosed in patent literature 3, assembling and maintenance cannot be easily performed.

SUMMARY OF THE INVENTION

The present invention was developed in view of the above points and an object thereof is to provide an industrial robot capable of ensuring a long distance from a rotation axis of an arm to a tool mounting portion and accurately positioning the tool mounting portion by a compact structure.

In order to accomplish the above object, one aspect of the present invention is directed to an industrial robot, comprising:

a tool mounting portion to which a tool is to be mounted;

a tool mounting rotation arm to which the tool mounting portion is to be so mounted as to rotate about a rotation axis;

a swing arm for pivotally supporting the tool mounting rotation arm via a pivot shaft;

a tool mounting rotation arm driving motor provided in the swing arm and adapted to generate a rotational drive force of the tool mounting rotation arm;

a tool mounting rotation arm driving transmission mechanism for transmitting the rotational drive force of the tool mounting rotation arm driving motor to the pivot shaft;

a tool mounting rotation arm driving reduction mechanism provided in the swing arm, engaged with the outer periphery of the pivot shaft and adapted to pivot the tool mounting rotation arm while decelerating the rotational drive force of the pivot shaft;

a tool mounting portion driving motor provided in the swing arm and adapted to generate a rotational drive force of the tool mounting portion;

an intermediate power transmission shaft which is arranged on the inner periphery of the pivot shaft and operates on the same axis;

a tool mounting portion driving first transmission mechanism for transmitting the rotational drive force supplied from the tool mounting portion driving motor to the intermediate power transmission shaft;

an output power transmission shaft provided in the tool mounting rotation arm in parallel with the intermediate power transmission shaft;

a tool mounting portion driving second transmission mechanism provided in the tool mounting rotation arm and adapted to transmit the rotation of the intermediate power transmission shaft to the output power transmission shaft;

an intermediate output gear which is mounted on the output power transmission shaft and operates on the same axis;

a tool mounting portion driving reduction unit provided in the tool mounting rotation arm, engaged with the intermediate output gear and adapted to decelerate the rotation of the intermediate output gear; and an output gear provided in the tool mounting portion driving reduction unit in the tool mounting rotation arm, engaged with an outer gear of the tool mounting portion and adapted to transmit the rotation decelerated by the tool mounting portion driving reduction unit to the tool mounting portion.

By this construction, the industrial robot transmits the rotation of the tool mounting portion driving motor provided in the swing arm to the intermediate power transmission shaft provided on the inner periphery of the pivot shaft via the tool mounting portion driving first transmission mechanism. When the intermediate power transmission shaft rotates, this rotation is transmitted to the output power transmission shaft via the tool mounting portion driving second transmission mechanism to rotate the intermediate output gear. When the intermediate output gear rotates, an input gear of the tool mounting portion driving reduction unit engaged with the intermediate output gear rotates and an input rotating shaft of the tool mounting portion driving reduction unit rotates. When the input rotating shaft rotates, the reduction mechanism rotates the output rotating shaft while decelerating the rotation of the input rotating shaft. When the output rotating shaft rotates, the output gear rotates and the tool mounting portion whose outer gear is engaged with the output gear rotates.

According to the above industrial robot of the present invention, the shapes of the vicinities of the swing arm, the pivot shaft and the tool mounting rotation arm can be made smaller since a rotational torque from the tool mounting portion driving motor to the intermediate output gear can be set to be small. Thus, interference of the swing arm, the pivot shaft and the tool mounting rotation arm with surrounding objects such as a work can be avoided, wherefore the industrial robot can be easily applied to works in narrow places. Further, since the tool mounting rotation arm driving reduction unit can be housed in the tool mounting rotation arm in a compact manner, interference of the tool mounting rotation arm with surrounding objects such as a work can be avoided, wherefore the industrial robot can be easily applied to works in narrow places.

These and other objects, features and advantages of the present invention will become apparent upon reading of the following detailed description along with the accompanying drawings.

BRIEF DESCRIPTION OF DRAWINGS

FIG. 1 are construction diagrams of an essential part of one embodiment of an industrial robot according to the present invention, wherein FIG. 1A is a side view in section of the essential part and FIG. 1B is a top view in section of a swing arm and a tool mounting rotation arm, FIG. 6 is a perspective view of the embodiment of the industrial robot according to the present invention, FIG. 7 are side views of an exemplary prior art, wherein FIG. 7B is a side view when the tool mounting rotation arm is bent at 90° and FIG. 7C is a side view at the time of a welding operation, FIG. 8 are side views of another exemplary prior art, wherein FIG. 8A is a side view when a distance from a pivot shaft to a tool mounting portion is short and FIG. 8B is a side view when a distance from the pivot shaft to the tool mounting portion is long, FIG. 9 are construction diagrams of an exemplary industrial robot which drives a conventional tool mounting portion using a large-diameter bevel gear, wherein FIG. 9A is a top view in section and FIG. 9B is a side view, and FIG. 10 are construction diagrams of an exemplary industrial robot which drives a conventional tool mounting portion using a small-diameter bevel gear, wherein

DETAILED DESCRIPTION OF INVENTION

First, an overall external configuration of an industrial robot 100 is described with reference to FIGS. 5 and 6.

Figure 5:
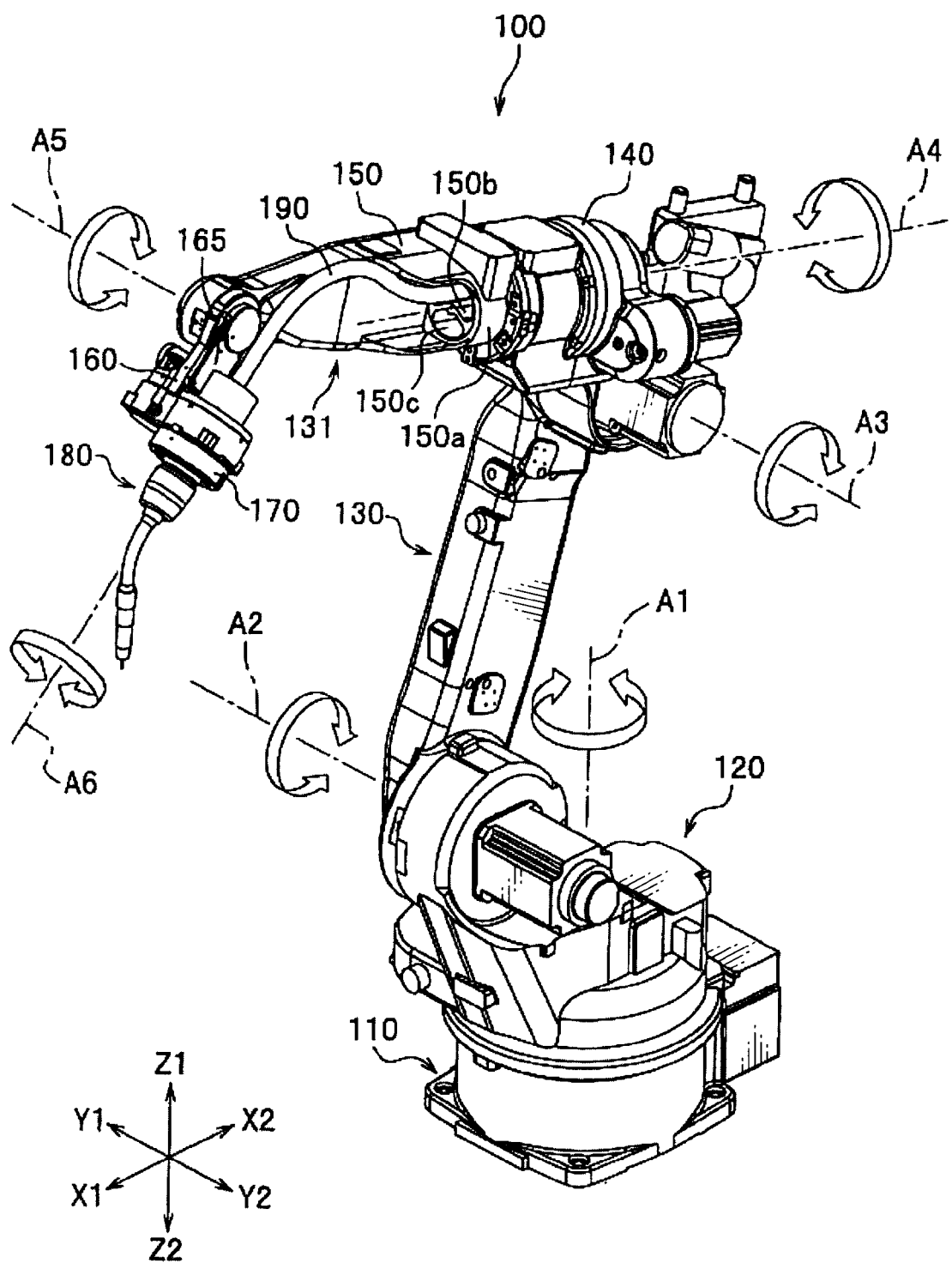
FIG. 5 is a perspective view of the embodiment of the industrial robot according to the present invention.
Figure 6:
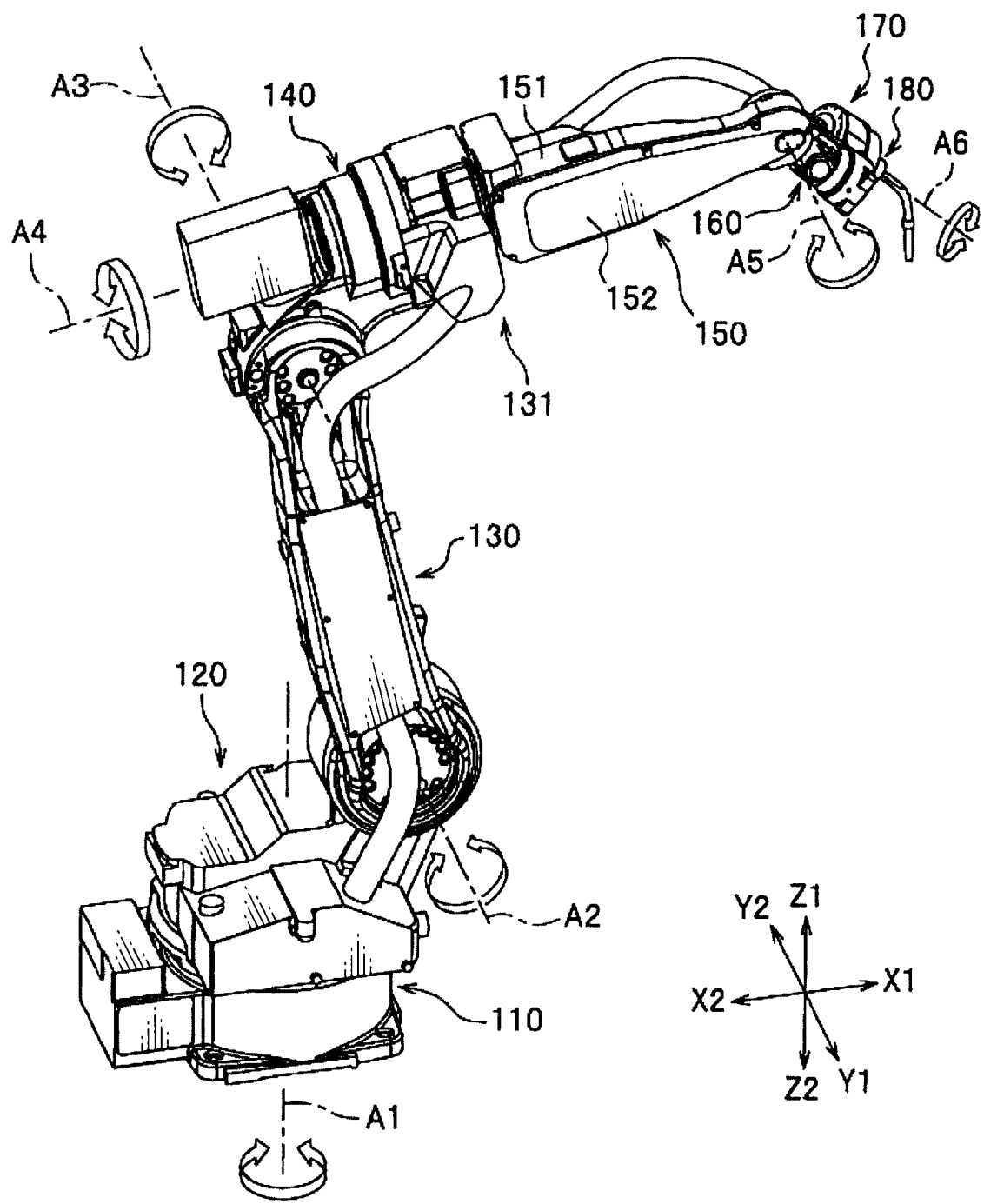
Figure 7A:
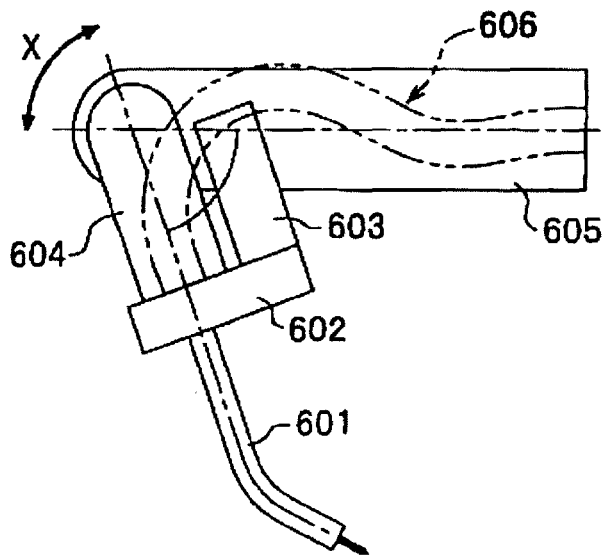
FIG. 7A is a side view when the tool mounting rotation arm is bent at an acute angle.
Figure 7B:
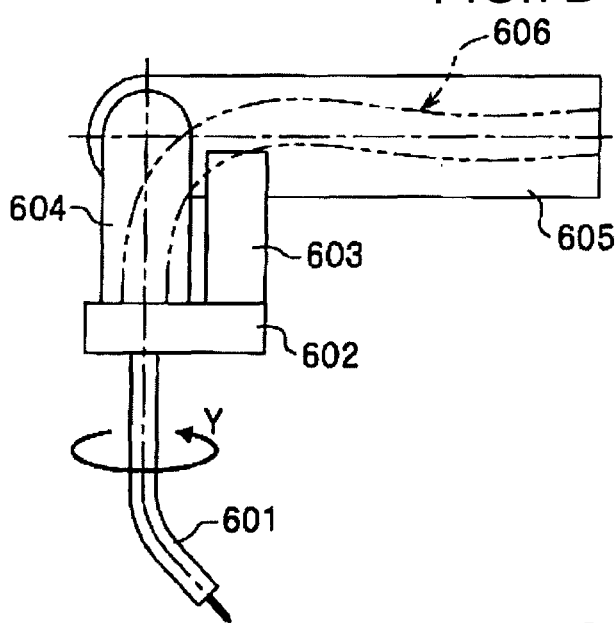
Figure 7C:
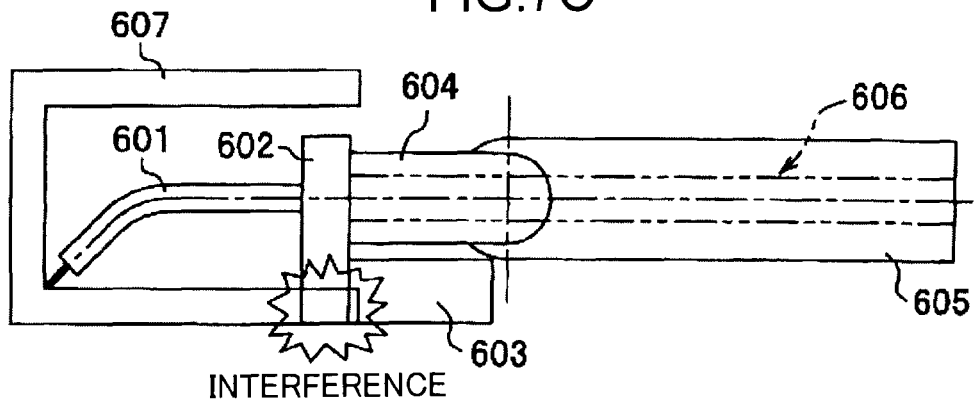
Figure 8A:
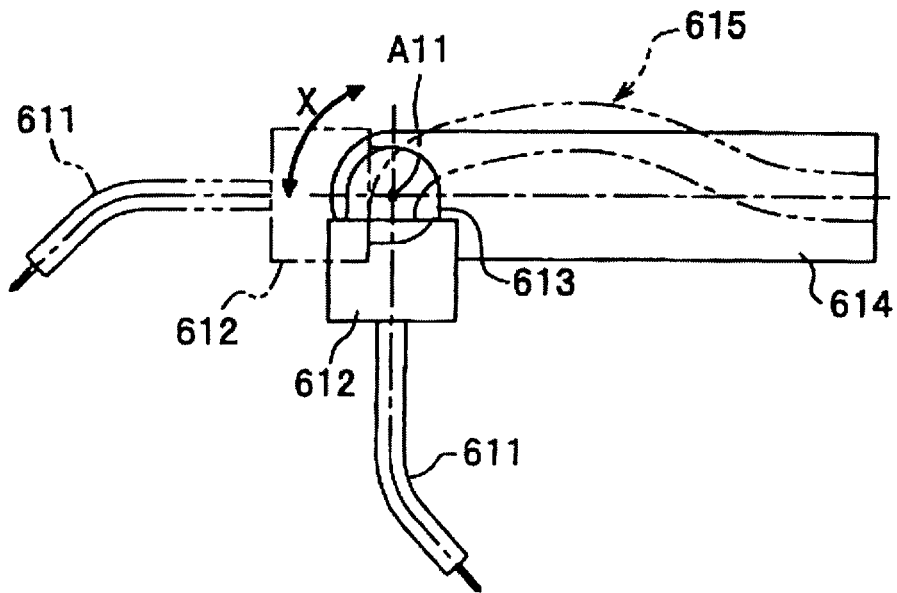
Figure 8B:
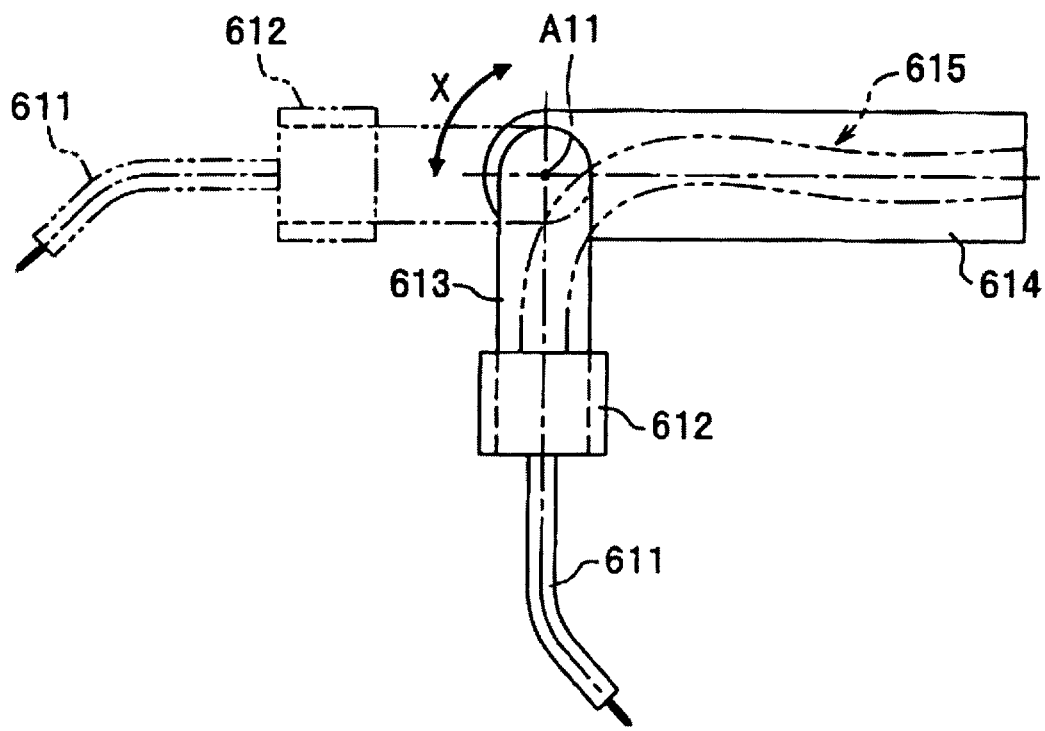
Figure 9A:
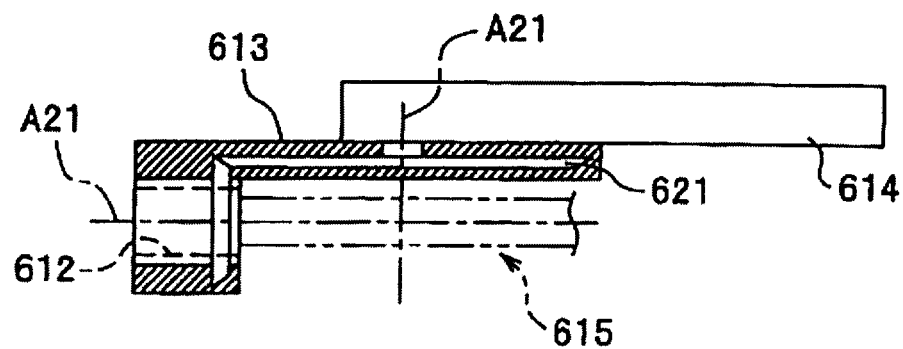
Figure 9B:
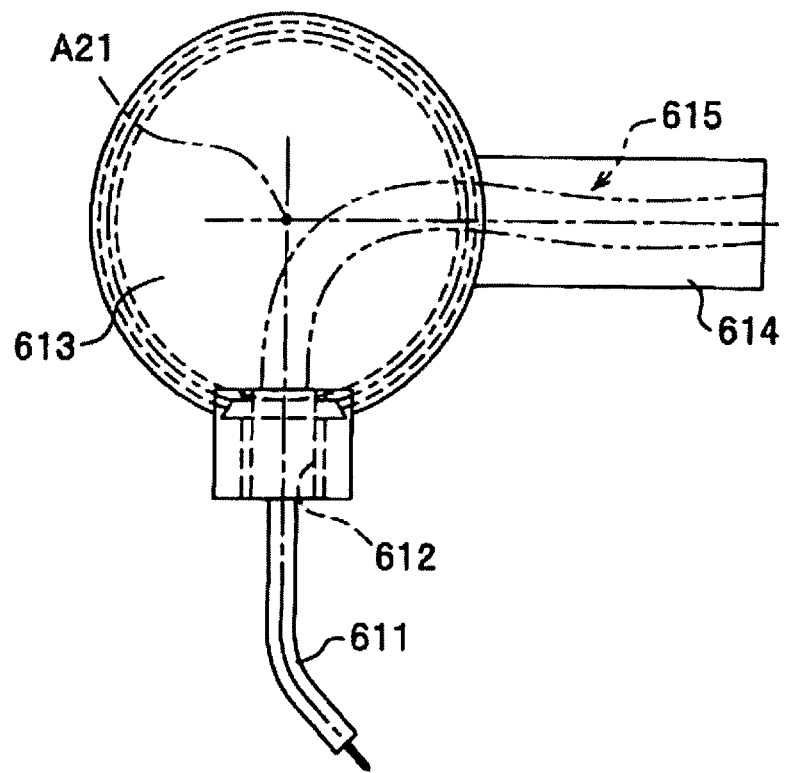
Figure 10A:
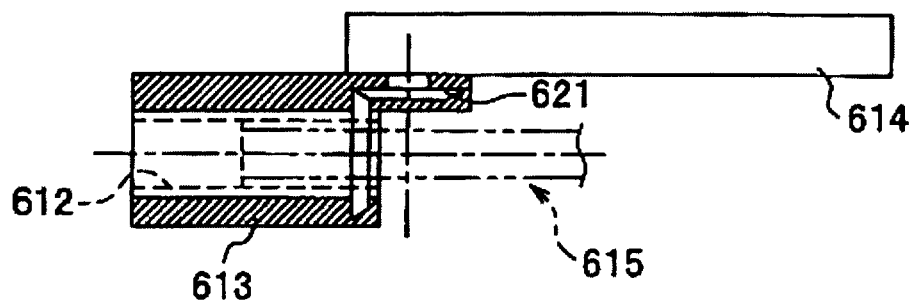
FIG. 10A is a top view in section and FIG. 10B is a side view.
Figure 10B:
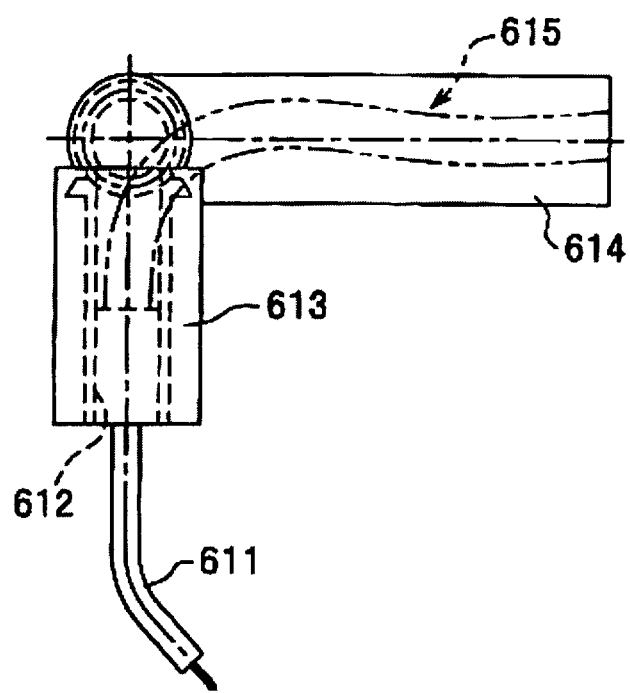

The industrial robot 100 of this embodiment is a so-called six-axis articulated robot and includes a robot base 110 to be fixed to a mounting surface, a rotation arm 120 which rotates about a first axis A1 on the robot base 110, a lower arm 130 which is connected to the rotation arm 120 and rotates about a second axis A2, and an upper arm 131 which is connected to the lower arm 130 and rotates about a third axis A3 as shown in FIGS. 5 and 6.

The robot base 110 is fixed, for example, to a predetermined mounting surface such as a floor surface of a work site. The rotation frame 120 is so mounted on the robot 110 as to be driven and rotated about the first axis A1. The first axis A1 is an axis extending in a direction orthogonal to the mounting surface. The rotation frame 120 is so mounted on the robot base 110 that the lower arm 130 can be driven and rotated about the second axis A2.

The lower arm 130 has one end so mounted on the rotation frame 120 as to be driven and rotated about the second axis A2. The second axis A2 is an axis extending in a direction orthogonal to the first axis A1 and parallel to the mounting surface. The upper arm 131 is so mounted to the lower arm 130 as to be driven and rotated about the third axis A3.

The upper arm 131 includes a shoulder 140 which is connected to the lower arm 130 and rotates about the third axis A3, a swing arm (fifth-axis arm) 150 which is connected to the shoulder 140 and rotates about a fourth axis A4, a tool mounting rotation arm (end arm) 160 which is connected to the swing arm 150 and rotates about a fifth axis A5 and a tool mounting portion 170 which is mounted to the tool mounting rotation arm 160 and rotates about a sixth axis A6.

The shoulder 140 is so mounted on the other end of the lower arm 130 as to be able to be driven and rotated about the third axis A3. The third axis A3 is an axis about which the swing arm 150 is vertically driven and which extends in a direction parallel to the second axis A2. One end of the swing arm 150 is mounted to the shoulder 140 in a direction orthogonal to the third axis A3. The swing arm 150 is so mounted as to be driven and rotated about the fourth axis A4. The fourth axis A4 is an axis extending in a direction orthogonal to the third axis A3.

The tool mounting rotation arm 160 has one end mounted to the other end of the swing arm 150 to be driven and rotated about the fifth axis A5. The fifth axis A5 is an axis extending in a direction parallel to the third axis A3 and orthogonal to the fourth axis A4.

The tool mounting portion 170 has a substantially cylindrical shape and is so mounted to the other end of the tool mounting rotation arm 160 as to be driven and rotated about the sixth axis A6. A tool 180 is mounted to the tool mounting portion 170. The sixth axis A6 is an axis orthogonal to the fifth axis A5 and crosses the fourth axis A4 on the fifth axis A5, and the tool mounting portion 170 is rotated about this axis. The tool 180 is inserted into an inner peripheral side of the tool mounting portion 170 to be mounted to the tool mounting portion 170. The tool 180 is, for example, a welding tool and connected to a cable 190 at a side of the tool mounting portion 170 toward the swing arm 150. The swing arm 150 is formed with a cable through hole 150a on the fourth axis A4. The cable through hole 150a includes through holes 150b, 150c penetrating in a direction of the fourth axis A4, and the cable 190 is connected to the tool 180 through the through hole 150b.

Next, internal structures of the swing arm 150, the tool mounting rotation arm 160 and the tool mounting portion 170 of the industrial robot 100 according to the present invention are described with reference to FIGS. 1 to 4.

As shown in FIG. 1, the swing arm 150 includes a swing arm main body 151 and a swing arm cover 152. A tool mounting rotation arm driving motor 311 for generating a rotational drive force of the tool mounting rotation arm 160, a pivot shaft 313 rotated by the rotation of the tool mounting rotation arm driving motor 311, a tool mounting rotation arm driving transmission mechanism 300 for transmitting the rotation of the tool mounting rotation arm driving motor 311 to the pivot shaft 313, an intermediate power transmission shaft 422 which is arranged around the pivot shaft 313 and operates on the same axis, and a tool mounting portion driving first transmission mechanism 412a for transmitting the rotation of a tool mounting portion driving motor 411 to the intermediate power transmission shaft 422 are housed in a driving mechanism housing portion 153 formed by the swing arm main body 151 and the swing arm cover 152.

The driving mechanism housing portion 153 is formed such that a bottom surface is located at a side indicated by Y2 and an opening is located at a side indicated by Y1 in a posture shown in FIGS. 5 and 6. The opening of the driving mechanism housing portion 153 is closed with the swing arm cover 152.

The tool mounting rotation arm driving motor 311 housed in the driving mechanism housing portion 153 is a motor for generating a rotational drive force for pivoting the tool mounting rotation arm 160 about the fifth axis A5, and provided at a side of the driving mechanism housing portion 153 of the swing arm main body 151 toward the shoulder 140. Further, the tool mounting portion driving motor 411 housed in the driving mechanism housing portion 153 together with the tool mounting rotation arm driving motor 311 is a motor for generating a rotational drive force to rotate the tool mounting portion 170 about the sixth axis A6, and provided in parallel with the tool mounting rotation arm driving motor 311. The tool mounting rotation arm driving motor 311 and the tool mounting portion driving motor 411 are arranged one above the other in a posture of the swing arm 150 shown in FIGS. 5 and 6.

A rotating shaft 311a of the tool mounting rotation arm driving motor 311 extends in a direction orthogonal to an extending direction (directions of arrows shown by X1, X2 in FIG. 1) of the tool mounting rotation arm driving motor 311 and parallel to the fifth axis A5 as a center of rotation of the pivot shaft 313. A rotating shaft 411a of the tool mounting portion driving motor 411 extends in a direction orthogonal to an extending direction (directions of arrows shown by X1, X2 in FIG. 1) of the tool mounting portion driving motor 411 and parallel to the fifth axis A5 as a center of rotation of the pivot shaft 313. Here, in the posture of the swing arm 150 shown in FIGS. 5 and 6, the rotating shaft 311a of the tool mounting rotation arm driving motor 311 and the rotating shaft 411a of the tool mounting portion driving motor 411 are so arranged one above the other to respectively project from the tool mounting rotation arm driving motor 311 and the tool mounting portion driving motor 411 that the rotating shaft 311a is located at an upper side and the rotating shaft 411a is located at a lower side.

The rotation of the tool mounting rotation arm driving motor 311 is transmitted to the pivot shaft 313 via the tool mounting rotation arm driving transmission mechanism 300, whereas the rotation of the tool mounting portion driving motor 411 is transmitted to the intermediate power transmission shaft 422 via the tool mounting portion driving first transmission mechanism 412a.

The tool mounting rotation arm driving transmission mechanism 300 includes a tool mounting rotation arm driving input pulley 312 mounted on the rotating shaft 311a of the tool mounting rotation arm driving motor 311, a tool mounting rotation arm driving output pulley 314 mounted on one end of the pivot shaft 313, and a tool mounting rotation arm driving belt 315 wound around the tool mounting rotation arm driving input pulley 312 and the tool mounting rotation arm driving output pulley 314 and adapted to transmit the rotation of the tool mounting rotation arm driving input pulley 312 to the tool mounting rotation arm driving output pulley 314.

The tool mounting portion driving first transmission mechanism 412a includes a tool mounting portion driving first input pulley 421 mounted on the rotating shaft 411a of the tool mounting portion driving motor 411, a tool mounting portion driving first output pulley 423 mounted on one end of the intermediate power transmission shaft 422, and a tool mounting portion driving first belt 424 wound around the tool mounting portion driving first input pulley 421 and the tool mounting portion driving first output pulley 423 and adapted to transmit the rotation of the tool mounting portion driving first input pulley 421 to the tool mounting portion driving first output pulley 423.

The tool mounting rotation arm driving input pulley 312 and the tool mounting portion driving first input pulley 421 are arranged at positions shifted in a height direction of the rotating shafts 311a, 411a so that the tool mounting rotation arm driving input pulley 312 is closer to the swing arm main body 151 and the tool mounting portion driving first input pulley 421 is closer to the swing arm cover 152.

Figure 2:
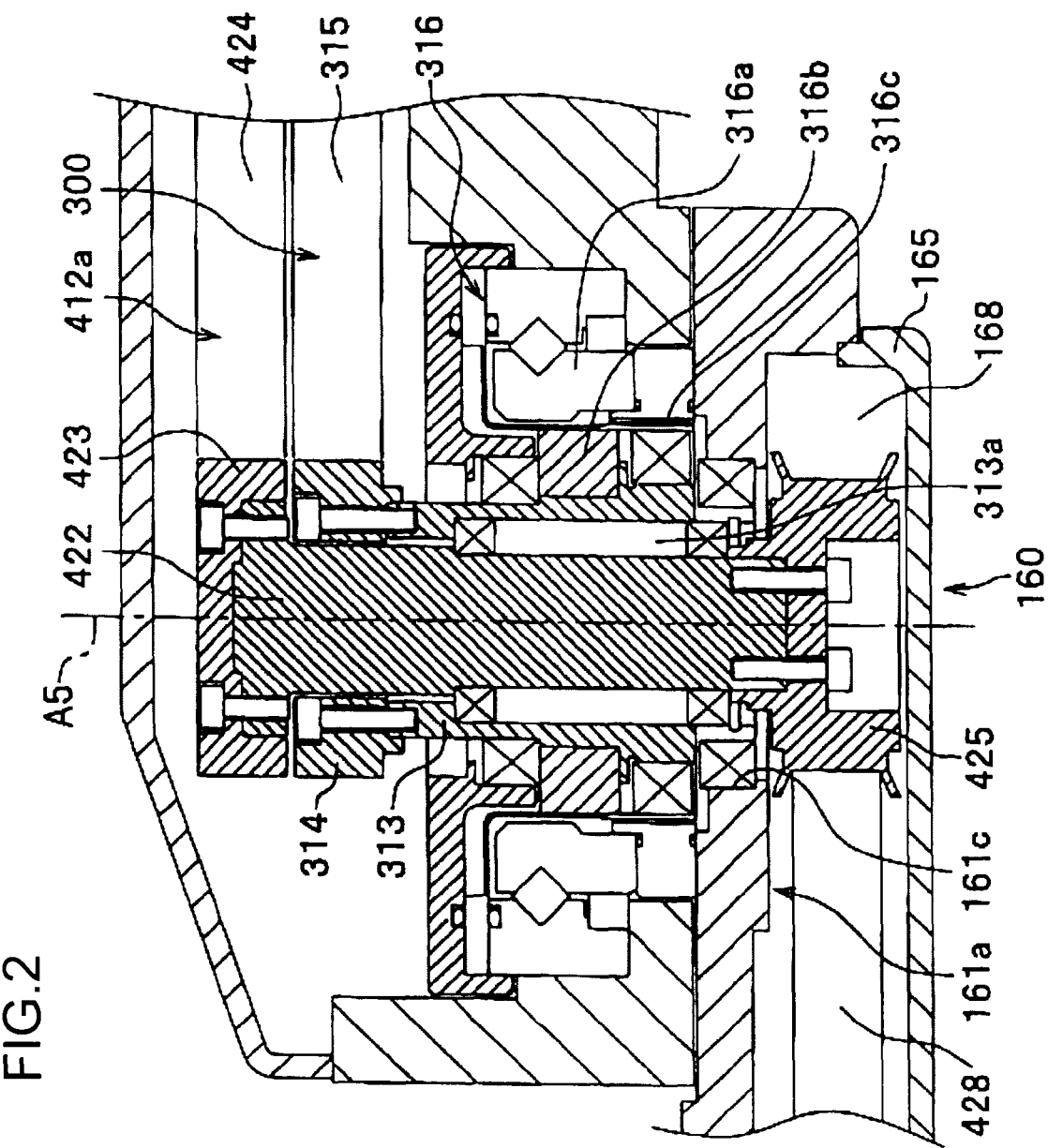
FIG. 2 is a side view in section around a fifth axis of the embodiment of the industrial robot according to the present invention.

The tool mounting rotation arm driving input pulley 312 rotates in directions of arrows R1 according to the rotation of the tool mounting rotation arm driving motor 311. Further, the tool mounting portion driving first input pulley 421 rotates in directions of arrows R11 according to the rotation of the tool mounting portion driving motor 411. As shown in FIG. 2, at a side of the swing arm 150 toward the tool mounting rotation arm 160, the intermediate power transmission shaft 422 is so provided on the fifth axis A5 as to rotate about the fifth axis A5. The pivot shaft 313 is so mounted on an outer peripheral portion of the intermediate power transmission shaft 422 via a bearing 313a as to rotate about the fifth axis A5.

The intermediate power transmission shaft 422 is provided to project more toward the swing arm cover 152 than the pivot shaft 313 and the tool mounting portion driving first output pulley 423 is fixed to an end thereof. The intermediate power transmission shaft 422 is passed through a center hole of the tool mounting rotation arm driving output pulley 314, which is mounted on the pivot shaft 313 by bolts with a clearance formed below the tool mounting portion driving first output pulley 423. In other words, the pivot shaft 313 is so provided as to be operable on the same axis as the intermediate power transmission shaft 422. The tool mounting rotation arm driving output pulley 314 and the tool mounting portion driving first output pulley 423 are arranged on the fifth axis A5 while being spaced apart in an axial direction, so that the tool mounting portion driving first output pulley 423 is closer to the swing arm cover 152 and the tool mounting rotation arm driving output pulley 314 is closer to the swing arm main body 151. The tool mounting rotation arm driving belt 315 is wound around the tool mounting rotation arm driving input pulley 312 and the tool mounting rotation arm driving output pulley 314, and the tool mounting portion driving first belt 424 is wound around the tool mounting portion driving first input pulley 421 and the tool mounting portion driving first output pulley 423.

As shown in FIG. 1A, the tool mounting rotation arm driving output pulley 314 is rotated in directions of arrows R2 about the fifth axis A5 by the tool mounting rotation arm driving belt 315 driven by the rotation of the tool mounting rotation arm driving input pulley 312 in the directions of arrows R1, thereby rotating the pivot shaft 313 in the directions of arrows R2. The tool mounting portion driving first output pulley 423 is rotated in the directions of arrows R2 about the fifth axis A5 by the tool mounting portion driving first belt 424 driven by the rotation of the tool mounting portion driving first input pulley 421 in the directions of arrows R11, thereby rotating the intermediate power transmission shaft 422 in the directions of arrows R2.

As shown in FIG. 2, the pivot shaft 313 is engaged with the tool mounting rotation arm driving reduction mechanism 316 provided around the pivot shaft 313 to drive the tool mounting rotation arm driving reduction mechanism 316. The tool mounting rotation arm driving reduction mechanism 316 is a reduction mechanism provided between the pivot shaft 313 and the tool mounting rotation arm 160 around the pivot shaft 313 to decelerate the rotation of the pivot shaft 313 and pivot the tool mounting rotation arm 160 and, for example, composed of a wave gear device called a harmonic reduction mechanism.

The tool mounting rotation arm driving reduction mechanism 316 includes a circular spline (C/S) 316a, a wave generator (W/G) 316b and a flex spline (F/S) 316c. The wave generator (W/G) 316b has a cam shape with a substantially elliptical cross-sectional shape, is connected to the tool mounting rotation arm driving output pulley 314 and rotates according to the rotation of the tool mounting rotation arm driving output pulley 314. The flex spline (F/S) 316c is a member made of a metallic elastic body, fixed to the tool mounting rotation arm 160 and arranged on an outer peripheral side of the wave generator (W/G) 316b. The wave generator (W/G) 316b slides on the inner periphery of the flex spline (F/S) 316c.

The circular spline (C/S) 316a is a rigid ring-shaped member and fixed to the swing arm 150. The circular spline (C/S) 316a is arranged at an outer peripheral side of the flex spline (F/S) 316c. Gears are formed on an inner peripheral side of the circular spline (C/S) 316a and an outer peripheral side of the flex spline (F/S) 316c. The gear of the circular spline (C/S) 316a and that of the flex spline (F/S) 316c are engaged in a longitudinal direction of the wave generator (W/G) 316b. When the wave generator (W/G) 316b rotates, an engaged position of the gear of the circular spline (C/S) 316a and that of the flex spline (F/S) 316c successively changes.

If the tooth number of the gear of the flex spline (F/S) 316c is smaller than that of the gear of the circular spline (C/S) 316a, the rotation of the flex spline (F/S) 316c is gradually retarded relative to that of the circular spline (C/S) 316a. In other words, the rotation of the flex spline (F/S) 316c is decelerated relative to that of the wave generator (W/G) 316b. Note that a reduction ratio is determined by a ratio of the tooth number of the gear of the circular spline (C/S) 316a and that of the gear of the flex spline (F/S) 316c.

Note that the tool mounting rotation arm driving reduction mechanism 316 is not limited to a wave gear mechanism or the like and may be another reduction mechanism such as a planetary gear mechanism. The tool mounting rotation arm 160 is mounted to the tool mounting rotation arm driving reduction mechanism 316. The tool mounting rotation arm 160 pivots about the fifth axis A5 by the rotation of the tool mounting rotation arm driving reduction mechanism 316.

Figure 4:
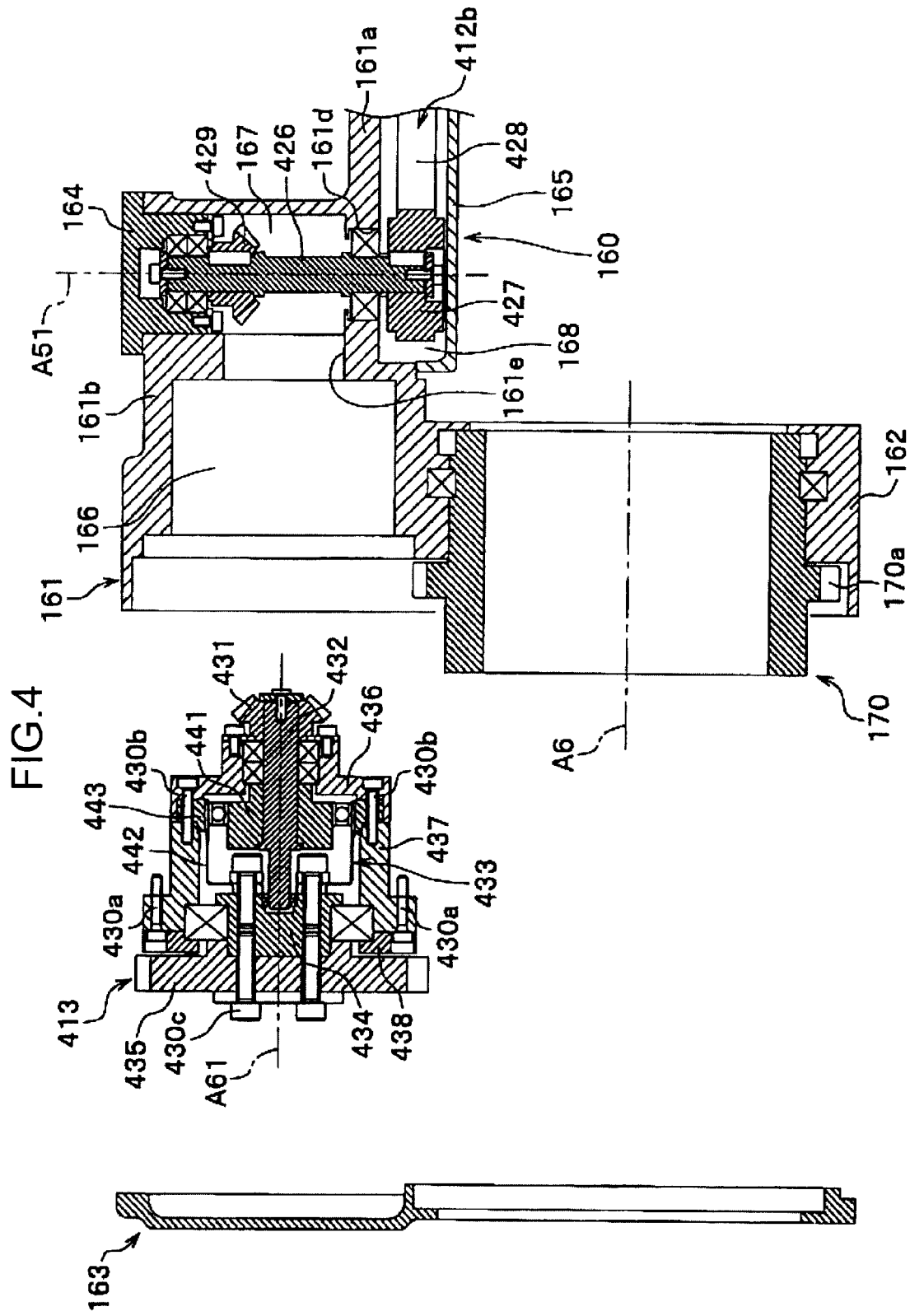
FIG. 4 is a top view in section of the tool mounting rotation arm of the embodiment of the industrial robot according to the present invention.

As shown in FIGS. 2 and 4, the tool mounting rotation arm 160 includes a tool mounting rotation arm main body 161, a tool mounting portion attaching portion 162, a tool mounting rotation arm cover 163, a bearing cover 164, a transmission mechanism housing portion cover 165, a reduction mechanism housing portion 166, an output power transmission shaft housing portion 167 and a transmission mechanism housing portion 168.

The tool mounting rotation arm main body 161 mainly includes a swing arm mounting portion 161a and a reduction mechanism mounting portion 161b. The swing arm mounting portion 161a includes the transmission mechanism housing portion 168 at a side of the swing arm 150 toward the fourth axis A4. A through hole 161c through which the intermediate power transmission shaft 422 penetrates is formed on the fifth axis A5 in the transmission mechanism housing portion 168. The tool mounting portion driving second transmission mechanism 412b is housed in this transmission mechanism housing portion 168. The tool mounting portion driving second transmission mechanism 412b includes a tool mounting portion driving second input pulley 425, a tool mounting portion driving second output pulley 427 and a tool mounting portion driving second belt 428.

Figure 3:
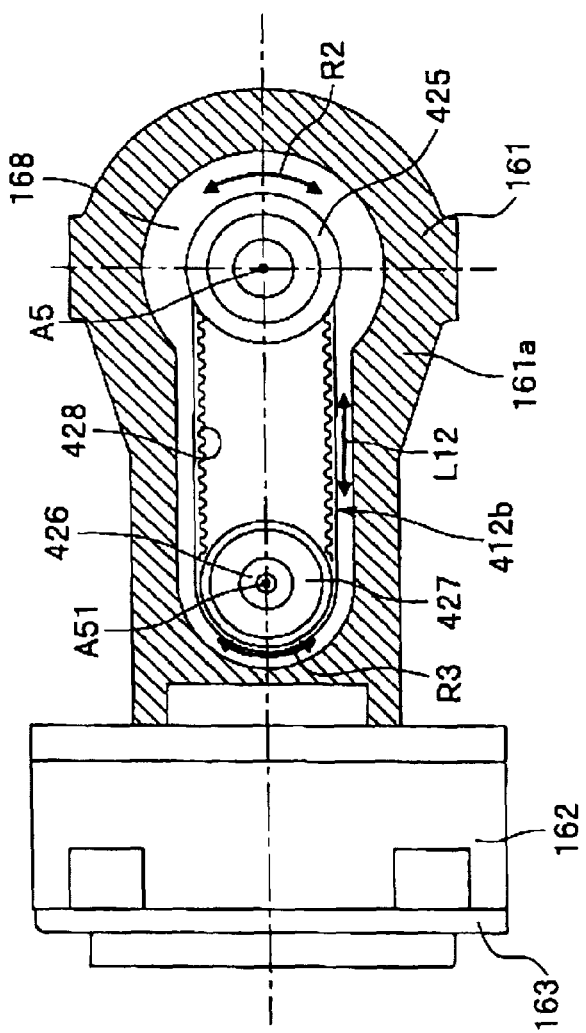
FIG. 3 is a side view in section of the tool mounting rotation arm of the embodiment of the industrial robot according to the present invention.

As shown in FIG. 2, the periphery of the through hole 161c of the swing arm mounting portion 161a is fixed to an output side of the tool mounting rotation arm driving reduction mechanism 316 via a bearing. The intermediate power transmission shaft 422 partly projects into the transmission mechanism housing portion 168 via the through hole 161c. The tool mounting portion driving second input pulley 425 is mounted on the projecting part of the intermediate power transmission shaft 422 by bolts. The tool mounting portion driving second input pulley 425 rotates in the directions of arrows R2 (see FIG. 1A) according to the rotation of the intermediate power transmission shaft 422. As shown in FIGS. 3 and 4, the tool mounting portion driving second output pulley 427 is mounted on a part of an output power transmission shaft 426 to be described later projecting into the transmission mechanism housing portion 168. The tool mounting portion driving second belt 428 is wound around the tool mounting portion driving second input pulley 245 and the tool mounting portion driving second output pulley 427.

As shown in FIGS. 1 and 4, the reduction mechanism mounting portion 161b is connected to a leading end side of the swing arm mounting portion 161a. The reduction mechanism mounting portion 161b is provided between the swing arm 150 and the tool mounting portion 170. The reduction mechanism mounting portion 161b includes the reduction mechanism housing portion 166 and the output power transmission shaft housing portion 167. The reduction mechanism housing portion 166 is open in a direction toward the tip of the swing arm 150 and the output power transmission shaft housing portion 167 is provided adjacent to the transmission mechanism housing portion 168. The output power transmission shaft housing portion 167 and the transmission mechanism housing portion 168 communicate via a through hole 161d. One end of the output power transmission shaft 426 is rotatably mounted in the through hole 161d via a bearing or the like. An opening of the transmission mechanism housing portion 168 is covered by the transmission mechanism housing portion cover 165.

As shown in FIG. 4, a side of the output power transmission shaft housing portion 167 opposite to the transmission mechanism housing portion 168 on a rotation axis A51 is formed to be openable, and a bearing cover 164 is mounted in this opening by bolts or the like. The bearing cover 164 rotatably holds an end of the output power transmission shaft 426 by means of a bearing. Thus, the output power transmission shaft 426 is held by the through hole 161d and the bearing of the bearing cover 164, and the rotation of the tool mounting portion driving second input pulley 425 is transmitted to the tool mounting portion driving second output pulley 427 via the tool mounting portion driving second belt 428 to rotate the tool mounting portion driving second output pulley 427, whereby the output power transmission shaft 426 rotates about the rotation axis A51.

The reduction mechanism housing portion 166 and the output power transmission shaft housing portion 167 communicate via a through hole 161e as shown in FIG. 4. An intermediate output gear 429 is mounted on the output power transmission shaft 426. The intermediate output gear 429 is composed of a bevel gear and engaged with a tool mounting portion driving reduction unit 413 via the though hole 161e.

As shown in FIG. 4, the tool mounting portion driving reduction unit 413 is mounted in the reduction mechanism housing portion 166 of the tool mounting rotation arm 160 to drive and rotate the tool mounting portion 170 while decelerating power supplied from the intermediate output gear 429. The tool mounting portion driving reduction unit 413 is unitized by integrally holding an input gear 431, an input rotating shaft 432, a reduction mechanism 433 and an output rotating shaft 434 by an input side holding portion 436, an intermediate holding portion 437 and an output side holding portion 438. An output gear 435 is engaged with an outer gear 170a of the tool mounting portion 170, mounted on the output rotating shaft 434 of the tool mounting portion driving reduction unit 413 by screws 430c and rotated by the power decelerated by the tool mounting portion driving reduction unit 413 to rotate the tool mounting portion 170.

The input gear 431 is, for example, composed of a bevel gear and fixed to the input rotating shaft 432. The input rotating shaft 432 is rotatably held in the input side holding portion 436 by a bearing or the like so as to rotate about a rotation axis A61 parallel to the sixth axis A6, and rotates according to the rotation of the input gear 431. The input rotating shaft 432 is engaged with the reduction mechanism 433. The reduction mechanism 433 is composed of a reduction mechanism for speed reduction on the same axis as the rotating shaft such as a wave gear device.

As shown in FIG. 4, the reduction mechanism 433 is, for example, composed of a wave gear device which is a reduction mechanism called a harmonic reduction mechanism. The reduction mechanism 433 includes a wave generator (W/G) 441, a flex spline (F/S) 442, a circular spline (C/S) 443, etc.

The wave generator (W/G) 441 is an elliptical cam member and connected to the input rotating shaft 432, and rotates according to the rotation of the input rotating shaft 432. The flex spline (F/S) 442 is arranged around the wave generator (W/G) 441. The flex spline (F/S) 442 is substantially in the form of a bottomed cylinder and provided around the wave generator (W/G) 441 to rotate about the rotation axis A61, and an inner peripheral side thereof is in sliding contact with the wave generator (W/G) 441 in a major axis direction. Further, the flex spline (F/S) 442 is so arranged that an inner peripheral part of an opening is in sliding contact with an outer peripheral portion of the wave generator (W/G) 441 in the major axis direction.

An external gear is formed on an outer peripheral portion of the opening of the flex spline (F/S) 442. The external gear of the flex spline (F/S) 442 is engaged with an internal gear formed on an inner peripheral portion of the circular spline (C/S) 443 in parts of the wave generator (W/G) 441 in the major axis direction. The external gear of the flex spline (F/S) 442 is set to have a smaller tooth number than the internal gear of the circular spline (C/S) 443, and the tooth number thereof is set according to a reduction ratio. The circular spline (C/S) 443 is fixed to be sandwiched between the input side holding portion 436 and the intermediate holding portion 437 by screws 430b.

When the input gear 431 is rotated by the rotation of the intermediate output gear 429, the input rotating shaft 432 rotates. The wave generator (W/G) 441 rotates according to this rotation of the input rotating shaft 432 and an engaged position of the external gear of the flex spline (F/S) 442 and the internal gear of the circular spline (C/S) 443 successively changes. At this time, the tooth number of the internal gear of the circular spline (C/S) 443 is set to be larger than that of the external gear of the flex spline (F/S) 442. Thus, the flex spline (F/S) 442 rotates with a delay corresponding to a tooth number difference between the flex spline (F/S) 442 and the circular spline (C/S) 443 for every rotation of the wave generator (W/G) 441. In other words, the rotation of the flex spline (F/S) 442 is decelerated relative to that of the wave generator (W/G) 441. Thus, the rotation of the wave generator (W/G) 441 is decelerated to rotate the flex spline (F/S) 442.

The output rotating shaft 434 is fixed to the flex spline (F/S) 442, mounted in the intermediate holding portion 437 via a bearing or the like and held rotatably about the rotation axis A61 relative to the intermediate holding portion 437 and the output side holding portion 438. Thus, the output rotating shaft 434 rotates according to the rotation of the flex spline (F/S) 442.

The tool mounting portion driving reduction unit 413 is fixed to the reduction mechanism housing portion 166 by screws 430a. The output gear 435 is fixed to the output rotating shaft 434 of the tool mounting portion driving reduction unit 413 by screws 430c and engaged with the outer gear 170a formed on the outer peripheral portion of the tool mounting portion 170. Thus, the output gear 435 rotates about the rotation axis A61 according to the rotation of the flex spline (F/S) 442 to rotate the tool mounting portion 170 about the sixth axis A6.

The tool mounting portion attaching portion 162 has a cylindrical shape centered on the sixth axis A6 and is provided adjacent to the reduction mechanism mounting portion 161b of the tool mounting rotation arm main body 161. The tool mounting portion 170 is attached to the tool mounting portion attaching portion 162. The tool mounting portion 170 has a cylindrical shape and has the outer gear 170a formed on the outer periphery over the entire circumference. The tool mounting portion 170 is attached in an inner peripheral side of the tool mounting portion attaching portion 162 via a bearing or the like with an end surface of the outer gear 170a toward the swing arm 150 engaged with a stepped portion of the tool mounting portion attaching portion 162. Further, the tool mounting portion 170 is so attached in the tool mounting portion attaching portion 162 that the output gear 435 is engaged with the outer gear 170a.

The tool mounting rotation arm cover 163 covers the opening of the reduction mechanism housing portion 166 and the periphery of the tool mounting portion attaching portion 162. The tool mounting rotation arm cover 163 is placed to be held in contact with an end surface of the outer gear 170a toward the tip of the tool mounting portion 170. Since the tool mounting portion 170 is mounted to the tool mounting rotation arm 160 while being rotatably held by the tool mounting portion attaching portion 162 and the tool mounting rotation arm cover 163, the outer gear 170a rotates about the sixth axis A6 by having a drive force transmitted by the output gear 435.

Next, a pivoting operation of the swing arm 150 is described with reference to FIGS. 1, 2 and 3.

Note that description is given assuming that directions indicated by R1, R11, L1, L11, L12, R2 and R3 are rotating or moving directions toward either one of the sides indicated by arrows.

A drive signal is supplied from a robot controller to the tool mounting rotation arm driving motor 311. The rotating shaft 311a of the tool mounting rotation arm driving motor 311 is rotated in the direction of arrow R1 in accordance with the drive signal from the robot controller.

When the rotating shaft 311a of the tool mounting rotation arm driving motor 311 rotates in the direction of arrow R1, the tool mounting rotation arm driving input pulley 312 rotates in the direction of arrow R1. The tool mounting rotation arm driving belt 315 moves in the direction of arrow L1 by the rotation of the tool mounting rotation arm driving input pulley 312. The tool mounting rotation arm driving output pulley 314 rotates in the direction of arrow R2 by the rotation of the tool mounting rotation arm driving belt 315 in the direction of arrow L1.

When the tool mounting rotation arm driving output pulley 314 rotates in the direction of arrow R2, the pivot shaft 313 rotates in the direction of arrow R2. When the pivot shaft 313 rotates in the direction of arrow R2, the tool mounting rotation arm driving reduction mechanism 316 rotates about the fifth axis A5 to drive and rotate the tool mounting rotation arm 160 in the direction of arrow R2 while decelerating the rotation of the pivot shaft 313. In the above manner, the tool mounting rotation arm 160 can be pivoted in the direction of arrow C shown in FIG. 1A about the fifth axis A5 by the rotation of the tool mounting rotation arm driving motor 311.

Next, a driving and rotating operation of the tool mounting portion 170 is described with reference to FIGS. 1 and 3.

When the rotating shaft of the tool mounting portion driving motor 411 rotates in the direction of arrow R11 as shown in FIG. 1A, the tool mounting portion driving first input pulley 421 rotates in the direction of arrow R11. When the tool mounting portion driving first input pulley 421 rotates in the direction of arrow R11, the tool mounting portion driving first belt 424 moves in the direction of arrow L11. When the tool mounting portion driving first belt 424 moves in the direction of arrow L11, the tool mounting portion driving first output pulley 423 rotates in the direction of arrow R2.

When the tool mounting portion driving first output pulley 423 rotates in the direction of arrow R2, the intermediate power transmission shaft 422 rotates in the direction of arrow R2 to rotate the tool mounting portion driving second input pulley 425 in the direction of arrow R2 as shown in FIG. 3. When the tool mounting portion driving second input pulley 425 rotates in the direction of arrow R2, the tool mounting portion driving second belt 428 moves in a direction of arrow L12. When the tool mounting portion driving second belt 428 moves in the direction of arrow L12, the tool mounting portion driving second output pulley 427 rotates in a direction of arrow R3. When the tool mounting portion driving second output pulley 427 rotates in the direction of arrow R3, the intermediate output gear 429 rotates in the direction of arrow R3.

When the intermediate output gear 429 rotates in the direction of arrow R3, the input gear 431 of the tool mounting portion driving reduction unit 413 rotates about the rotation axis A61 as shown in FIG. 4. When the input gear 431 rotates about the rotation axis A61, the input rotating shaft 432 rotates to drive the reduction mechanism 433.

The reduction mechanism 433 rotates the output rotating shaft 434 about the rotation axis A61 while decelerating the rotation of the input rotating shaft 432. When the output rotating shaft 434 rotates about the rotation axis A61, the output gear 435 rotates about the rotation axis A61. When the output gear 435 rotates about the rotation axis A61, the tool mounting portion 170 engaged with the output gear 435 rotates about the sixth axis A6. In this way, the rotation of the tool mounting portion driving motor 411 can be transmitted via the fifth axis A5 to rotate the tool mounting portion 170 about the sixth axis A6.

According to this embodiment, it is possible to reduce a rotational torque acting between the tool mounting portion driving motor 411 and the tool mounting portion driving reduction unit 413 and increase a rotational torque acting on the tool mounting portion 170 by incorporating the tool mounting portion driving motor 411 in the swing arm 150, transmitting the rotation of the tool mounting portion driving motor 411 to the tool mounting portion driving reduction unit 413 built in the tool mounting rotation arm 160 to drive the tool mounting portion driving reduction unit 413 via the tool mounting portion driving first input pulley 421, the intermediate power transmission shaft 422, the tool mounting portion driving first output pulley 423, the tool mounting portion driving first belt 424, the tool mounting portion driving second input pulley 425, the output power transmission shaft 426, the tool mounting portion driving second output pulley 427, the tool mounting portion driving second belt 428 and the intermediate output gear 429, and driving the tool mounting portion 170 with a drive force transmitted from the tool mounting portion driving motor 411 and decelerated by a part of the tool mounting rotation arm 160 immediately before the tool mounting portion 170. In this way, strengths of parts arranged between the tool mounting portion driving motor 411 and the tool mounting portion driving reduction unit 413 can be reduced as compared with the tool mounting portion driving reduction unit 413 and the parts arranged between the tool mounting portion driving motor 411 and the tool mounting portion driving reduction unit 413 can be composed of inexpensive parts.

For example, if a reduction ratio of the tool mounting portion driving reduction unit 413 is 1/30, it is sufficient for the parts arranged between the tool mounting portion driving motor 411 and the tool mounting portion driving reduction unit 413 to have strengths which withstand 1/30 of an output torque. Further, since the tool mounting portion driving reduction unit 413 is unitized in this embodiment, the whole unit can be assembled into the reduction mechanism housing portion 166 of the tool mounting rotation arm 160. Therefore, assemblability and maintainability can be improved.

Further, in this embodiment, since the output power transmission shaft 426 is driven via the tool mounting portion driving second input pulley 425, the tool mounting portion driving second belt 428 and the tool mounting portion driving second output pulley 427 from the fifth axis A5 to rotate the intermediate output gear 429 and drive the tool mounting portion driving reduction unit 413, a relatively long distance from the fifth axis A5 to the tool mounting portion 170 can be ensured. Thus, a bend radius of the cable 190 connected to the tool 180 can be increased, wherefore a load on the cable 190 caused by the rotation of the tool mounting rotation arm 160 about the fifth axis A5 can be reduced.

According to this embodiment, since the tool mounting portion driving motor 411 for rotating the tool mounting portion 170 about the sixth axis A6 is built in the swing arm 150, the vicinity of the tool mounting portion 170 can be made smaller, wherefore adaptability to narrow places and the like can be improved.

Further, according to this embodiment, the reduction mechanism 433 constituting the tool mounting portion driving reduction unit 413 decelerates using the wave gear device and can have a small size and a relatively large reduction ratio, the vicinity of the tool mounting portion 170 can be made smaller and the rotational position of the tool mounting portion 170 can be determined with high accuracy.

In summary, an industrial robot according to one aspect of the present invention comprises:

a tool mounting portion to which a tool is to be mounted;

a tool mounting rotation arm to which the tool mounting portion is to be so mounted as to rotate about a rotation axis;

a swing arm for pivotally supporting the tool mounting rotation arm via a pivot shaft;

a tool mounting rotation arm driving motor provided in the swing arm and adapted to generate a rotational drive force of the tool mounting rotation arm;

a tool mounting rotation arm driving transmission mechanism for transmitting the rotational drive force of the tool mounting rotation arm driving motor to the pivot shaft;

a tool mounting rotation arm driving reduction mechanism provided in the swing arm, engaged with the outer periphery of the pivot shaft and adapted to pivot the tool mounting rotation arm while decelerating the rotational drive force of the pivot shaft;

a tool mounting portion driving motor provided in the swing arm and adapted to generate a rotational drive force of the tool mounting portion;

an intermediate power transmission shaft which is arranged on the inner periphery of the pivot shaft and operates on the same axis;

a tool mounting portion driving first transmission mechanism for transmitting the rotational drive force supplied from the tool mounting portion driving motor to the intermediate power transmission shaft;

an output power transmission shaft provided in the tool mounting rotation arm in parallel with the intermediate power transmission shaft;

a tool mounting portion driving second transmission mechanism provided in the tool mounting rotation arm and adapted to transmit the rotation of the intermediate power transmission shaft to the output power transmission shaft;

an intermediate output gear which is mounted on the output power transmission shaft and operates on the same axis;

a tool mounting portion driving reduction unit provided in the tool mounting rotation arm, engaged with the intermediate output gear and adapted to decelerate the rotation of the intermediate output gear; and an output gear provided in the tool mounting portion driving reduction unit in the tool mounting rotation arm, engaged with an outer gear of the tool mounting portion and adapted to transmit the rotation decelerated by the tool mounting portion driving reduction unit to the tool mounting portion.

By this construction, the industrial robot transmits the rotation of the tool mounting portion driving motor provided in the swing arm to the intermediate power transmission shaft provided on the inner periphery of the pivot shaft via the tool mounting portion driving first transmission mechanism. When the intermediate power transmission shaft rotates, this rotation is transmitted to the output power transmission shaft via the tool mounting portion driving second transmission mechanism to rotate the intermediate output gear. When the intermediate output gear rotates, an input gear of the tool mounting portion driving reduction unit engaged with the intermediate output gear rotates and an input rotating shaft of the tool mounting portion driving reduction unit rotates. When the input rotating shaft rotates, the reduction mechanism rotates the output rotating shaft while decelerating the rotation of the input rotating shaft. When the output rotating shaft rotates, the output gear rotates and the tool mounting portion whose outer gear is engaged with the output gear rotates.

According to the above industrial robot of the present invention, the shapes of the vicinities of the swing arm, the pivot shaft and the tool mounting rotation arm can be made smaller since a rotational torque from the tool mounting portion driving motor to the intermediate output gear can be set to be small. Thus, interference of the swing arm, the pivot shaft and the tool mounting rotation arm with surrounding objects such as a work can be avoided, wherefore the industrial robot can be easily applied to works in narrow places. Further, since the tool mounting rotation arm driving reduction unit can be housed in the tool mounting rotation arm in a compact manner, interference of the tool mounting rotation arm with surrounding objects such as a work can be avoided, wherefore the industrial robot can be easily applied to works in narrow places.

In the above industrial robot, the tool mounting portion driving reduction unit may include an input gear engaged with the intermediate output gear; an input rotating shaft extending in a direction orthogonal to the output power transmission shaft and rotated by the rotation of the input gear; a reduction mechanism which is provided on the outer periphery of the input rotating shaft, operates on the input rotating shaft, is engaged with the input rotating shaft and adapted to decelerate the rotation of the input rotating shaft; and an output rotating shaft provided at one end side of the reduction mechanism and adapted to rotate the output gear mounted on an end portion with the rotation decelerated by the reduction mechanism.

By this construction, when the input gear is rotated by the rotation of the intermediate output gear in the industrial robot, the input rotating shaft accordingly rotates. When the input rotating shaft rotates, the reduction mechanism engaged with the input rotating shaft rotates the output rotating shaft while decelerating the rotation of the input rotating shaft. When the output rotating shaft rotates, the output gear mounted thereon rotates and the tool mounting portion whose outer gear is engaged with the output gear rotates.

According to the above construction, the shapes of the vicinities of the swing arm, the pivot shaft and the tool mounting rotation arm can be made smaller since a rotational torque from the tool mounting portion driving motor to the intermediate output gear can be set to be small. Thus, interference of the swing arm, the pivot shaft and the tool mounting rotation arm with surrounding objects such as a work can be avoided, wherefore the industrial robot can be easily applied to works in narrow places.

In the above industrial robot, the tool mounting portion driving second transmission mechanism may include a tool mounting portion driving second input pulley mounted on the other end of the intermediate power transmission shaft; a tool mounting portion driving second output pulley mounted on the output power transmission shaft; and a tool mounting portion driving second belt wound around the tool mounting portion driving second input pulley and the tool mounting portion driving second output pulley and adapted to transmit the rotation of the tool mounting portion driving second input pulley to the tool mounting portion driving second output pulley.

By this construction, when the intermediate power transmission shaft is rotated by the rotation of the tool mounting portion driving motor, the tool mounting portion driving second input pulley rotates and, accordingly, the tool mounting portion driving second belt moves and the tool mounting portion driving second output pulley rotates. When the tool mounting portion driving second output pulley rotates, the output power transmission shaft rotates to rotate the intermediate output gear. When the intermediate output gear rotates, the output gear is rotated via the tool mounting portion driving reduction unit to rotate the tool mounting portion.

According to the above construction, the need for parts which transmit a large torque can be eliminated by transmitting the rotation of the intermediate power transmission shaft to the output power transmission shaft via the tool mounting portion driving second input pulley, the tool mounting portion driving second output pulley and the tool mounting portion driving second belt to rotate the tool mounting portion driving reduction unit, and the construction is simple. Thus, the shape of the vicinity of the tool mounting portion can be made smaller and interference with surrounding objects such as a work can be avoided, wherefore the industrial robot can be easily applied to works in narrow places.

In the above industrial robot, the tool mounting portion driving reduction unit may include a holding portion for integrally holding the input rotating shaft, the reduction mechanism and the output rotating shaft.

By this construction, the industrial robot can be made smaller since the input rotating shaft, the reduction mechanism and the output rotating shaft are unitized by being integrally held by the holding portion.

According to the above construction, the input rotating shaft, the reduction mechanism and the output rotating shaft can be integrally handled by being held by the holding portion. Thus, they can be easily mounted into and detached from the tool mounting rotation arm, wherefore the industrial robot can be more easily manufactured and maintainability is improved.

In the industrial robot, the tool mounting rotation arm driving reduction mechanism may be composed of a harmonic reduction mechanism and include a wave generator, a flex spline and a circular spline; the wave generator may be fixed to the pivot shaft and rotated according to the rotation of the pivot shaft; the flex spline may be provided on the outer periphery of the wave generator and have the inner periphery thereof held in sliding contact with the wave generator and an outer gear formed on the outer periphery thereof; the flex spline may be fixed to the tool mounting rotation arm; the circular spline may be fixed to the swing arm and have an inner gear formed on the inner periphery thereof and engaged with the outer gear of the flex spline.

According to the above construction, the tool mounting rotation arm driving reduction mechanism can have a high reduction ratio, a light weight, a compact size and less backlash.

In the industrial robot, the reduction mechanism may be composed of a harmonic reduction mechanism and include a wave generator connected to the input rotating shaft and rotated according to the rotation of the input rotating shaft, a flex spline arranged around the wave generator and having an inner peripheral side thereof held in sliding contact with the wave generator and an outer gear formed on the outer periphery thereof, and a circular spline arranged on the outer periphery of the flex spline and having an inner gear formed on the inner periphery thereof and engaged with the outer gear of the flex spline; and the output rotating shaft may be fixed to the flex spline and rotated according to the rotation of the flex spline.

According to the above construction, the reduction mechanism can have a high reduction ratio, a light weight, a compact size and less backlash.

This application is based on Japanese Patent Application Serial No. 2010-093153 filed with Japan Patent Office on Apr. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An industrial robot, comprising:
a tool mounting portion to which a tool is to be mounted;
a tool mounting rotation arm to which the tool mounting portion is to be so mounted as to rotate about a rotation axis;
a swing arm for pivotally supporting the tool mounting rotation arm via a pivot shaft;
a tool mounting rotation arm driving motor provided in the swing arm and adapted to generate a rotational drive force of the tool mounting rotation arm;
a tool mounting rotation arm driving transmission mechanism for transmitting the rotational drive force of the tool mounting rotation arm driving motor to the pivot shaft;
a tool mounting rotation arm driving reduction mechanism provided in the swing arm, engaged with the outer periphery of the pivot shaft and adapted to pivot the tool mounting rotation arm while decelerating the rotational drive force of the pivot shaft;
a tool mounting portion driving motor provided in the swing arm and adapted to generate a rotational drive force of the tool mounting portion;
an intermediate power transmission shaft which is arranged on the inner periphery of the pivot shaft and operates on the same axis;
a tool mounting portion driving first transmission mechanism for transmitting the rotational drive force supplied from the tool mounting portion driving motor to the intermediate power transmission shaft;

an output power transmission shaft provided in the tool mounting rotation arm in parallel with the intermediate power transmission shaft;

a tool mounting portion driving second transmission mechanism provided in the tool mounting rotation arm and adapted to transmit the rotation of the intermediate power transmission shaft to the output power transmission shaft;

an intermediate output gear which is mounted on the output power transmission shaft and operates on the same axis;

a tool mounting portion driving reduction unit provided in the tool mounting rotation arm, engaged with the intermediate output gear and adapted to decelerate the rotation of the intermediate output gear; and an output gear provided in the tool mounting portion driving reduction unit in the tool mounting rotation arm, engaged with an outer gear of the tool mounting portion and adapted to transmit the rotation decelerated by the tool mounting portion driving reduction unit to the tool mounting portion.

2. An industrial robot as defined in claim 1, wherein the tool mounting portion driving reduction unit includes:

an input gear engaged with the intermediate output gear;

an input rotating shaft extending in a direction orthogonal to the output power transmission shaft and rotated by the rotation of the input gear;

a reduction mechanism which is provided on the outer periphery of the input rotating shaft, operates on the input rotating shaft, is engaged with the input rotating shaft and adapted to decelerate the rotation of the input rotating shaft; and an output rotating shaft provided at one end side of the reduction mechanism and adapted to rotate the output gear mounted on an end portion with the rotation decelerated by the reduction mechanism.

3. An industrial robot as defined in claim 1, wherein the tool mounting portion driving second transmission mechanism includes:

a tool mounting portion driving second input pulley mounted on the other end of the intermediate power transmission shaft;

a tool mounting portion driving second output pulley mounted on the output power transmission shaft; and a tool mounting portion driving second belt wound around the tool mounting portion driving second input pulley and the tool mounting portion driving second output pulley and adapted to transmit the rotation of the tool mounting portion driving second input pulley to the tool mounting portion driving second output pulley.

4. An industrial robot as defined in claim 2, wherein the tool mounting portion driving second transmission mechanism includes:

a tool mounting portion driving second input pulley mounted on the other end of the intermediate power transmission shaft;

a tool mounting portion driving second output pulley mounted on the output power transmission shaft; and a tool mounting portion driving second belt wound around the tool mounting portion driving second input pulley and the tool mounting portion driving second output pulley and adapted to transmit the rotation of the tool mounting portion driving second input pulley to the tool mounting portion driving second output pulley.

5. An industrial robot as defined in claim 1, wherein the tool mounting portion driving reduction unit includes a holding portion for integrally holding the input rotating shaft, the reduction mechanism and the output rotating shaft.

6. An industrial robot as defined in claim 2, wherein tool mounting portion driving reduction unit includes a holding portion for integrally holding the input rotating shaft, the reduction mechanism and the output rotating shaft.

7. An industrial robot as defined in claim 3, wherein tool mounting portion driving reduction unit includes a holding portion for integrally holding the input rotating shaft, the reduction mechanism and the output rotating shaft.

8. An industrial robot as defined in claim 4, wherein tool mounting portion driving reduction unit includes a holding portion for integrally holding the input rotating shaft, the reduction mechanism and the output rotating shaft.

9. An industrial robot as defined in claim 1, wherein:

the tool mounting rotation arm driving reduction mechanism is composed of a harmonic reduction mechanism and includes a wave generator, a flex spline and a circular spline;

the wave generator is fixed to the pivot shaft and rotated according to the rotation of the pivot shaft;

the flex spline is provided on the outer periphery of the wave generator, has the inner periphery thereof held in sliding contact with the wave generator and an outer gear formed on the outer periphery thereof and is fixed to the tool mounting rotation arm;

the circular spline is fixed to the swing arm and has an inner gear formed on the inner periphery thereof and engaged with the outer gear of the flex spline.

10. An industrial robot as defined in claim 2, wherein:

the reduction mechanism is composed of a harmonic reduction mechanism and includes:

a wave generator connected to the input rotating shaft and rotated according to the rotation of the input rotating shaft, a flex spline arranged around the wave generator and having an inner peripheral side thereof held in sliding contact with the wave generator and an outer gear formed on the outer periphery thereof, and a circular spline arranged on the outer periphery of the flex spline and having an inner gear formed on the inner periphery thereof and engaged with the outer gear of the flex spline; and the output rotating shaft is fixed to the flex spline and rotated according to the rotation of the flex spline.

* * * * *